Patented May 13, 1947

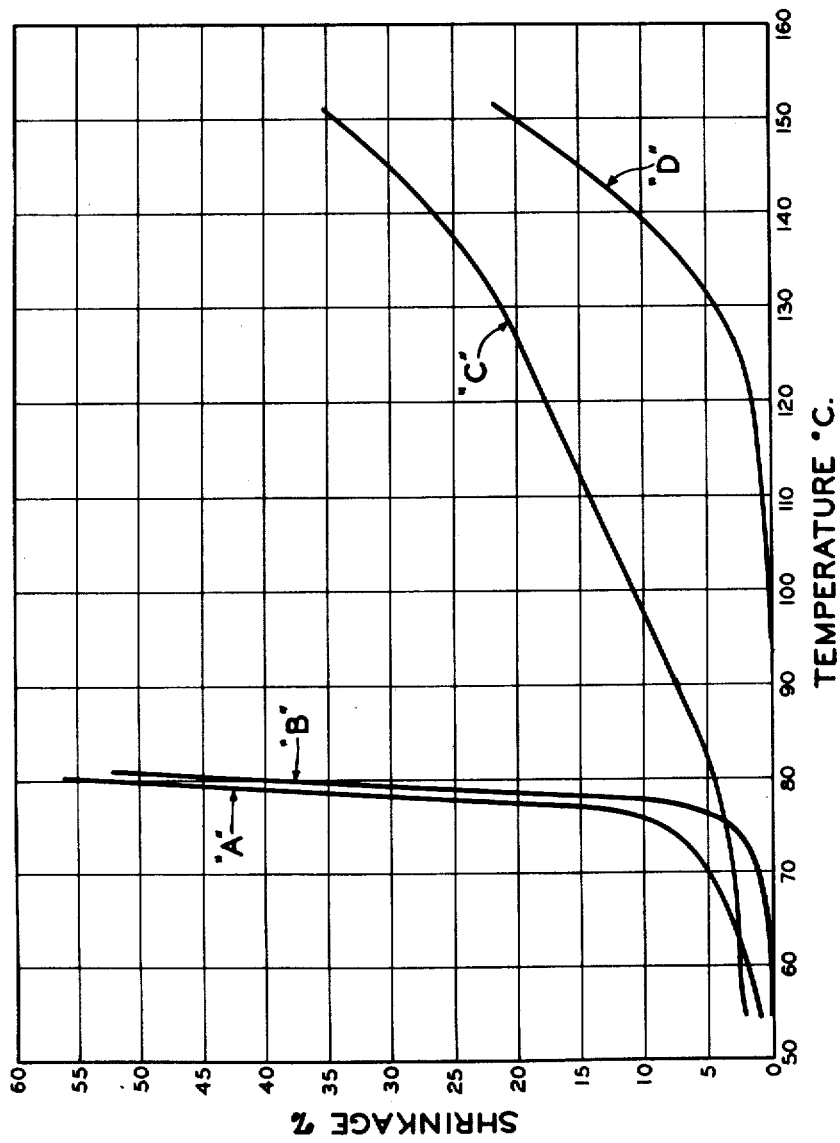

2,420,565

UNITED STATES PATENT OFFICE 2,420,565

SYNTHETIC TEXTILE ARTICLES

Edward W. Rugeley, Theophilus A. Feild, Jr., and John L. Petrokubi, Charleston, W. Va., assignors to Carbide and Carbon Chemicals Corporation, a corporation of New York Application February 20, 1943, Serial No. 476,616

7 Claims. (Cl. 28—82)

This invention relates to resinous compositions suitable for extrusion to form textile filaments; and to fibers, yarns, twine, and woven, knitted, braided, pile and other fabrics made therefrom. More especially it concerns the production of novel synthetic textile products, such as filaments, fibers, yarns, and articles made therefrom, which products have many unique and valuable properties distinguishing them from textile products made from synthetic resins heretofore known. The fibers and filaments of the invention have high true elasticity, flexibility, and high wet- and dry-tensile strengths; are resistant to water, various chemical agents and bacterial and fungal growths; will not support combustion; and are readily stabilized against shrinkage during processing of the fibers, and during normal service of the fabrics made therefrom. The invention includes methods of forming, treating and using the new fibers.

Fibers, yarns and fabrics made from various vinyl resins have long been in extensive commercial use. One type of vinyl resin having outstanding properties adapting it for the production of textiles is that made by the conjoint polymerization of a vinyl halide with a vinyl ester of an aliphatic acid, said resin containing between about 80% and about 95% of the halide in the polymer, and having a macromolecular weight of at least 15,000.

While the textile products made from such resins possess a high degree of utility for a wide variety of commercial uses, there has existed a keen demand for a textile filament and yarn which possesses a softening point well above that possessed by the aforesaid vinyl resin filaments, while retaining the desirable properties of the latter, and yet which can be readily made, preferably by conventional spinning and filament processing procedures from resins having suitable solubilities in the volatile solvents commonly employed in spinning compositions.

It has now been found that filaments and yarns having properties in general comparable to those made of the aforesaid vinyl resins, but having exceptionally high softening temperatures, excellent dyeing properties, and the surprising property of being readily stabilized dimensionally against subsequent shrinkage even when exposed to temperatures of somewhat above 100° C., may be made from certain vinyl resins produced by the conjoint polymerization of a vinyl halide and acrylonitrile, and containing between about 45% and about 80% of the halide in the polymers, and possessing specific viscosities at 20° C. of above 0.1, and preferably from 0.2 to 0.6. The filaments may be spun by either a wet- or a dry-spinning process. The high softening point of the new spinning type resin, the important property of dimensional stability at 100° C. readily imparted to filaments and yarns made therefrom, and the comparative ease of dyeing the latter, render these filaments exceedingly useful, not only for the usual textile applications but also for many others where filaments and yarns made of other types of vinyl resins and other thermoplastic materials are not entirely suitable.

The specific viscosities of the resins referred to herein are determined at 20° C., using an Ostwald viscosimeter, in accordance with the formula:

$$\text{Sp. vis.} = \frac{\text{Viscosity of a solution of 0.1 gram of the resin in 50 c. c. acetonyl acetone}}{\text{Viscosity of the acetonyl acetone}} - 1$$

The specific viscosity of the resin is a direct function of its average molecular weight.

For forming the filaments and yarns, preferably a solution or dispersion of the novel resin is spun into filaments by either a wet- or a dry-spinning operation. A thread or yarn of the desired size then is formed by twisting or doubling the filaments by any well-known procedure, after which the yarn is stretched for imparting thereto increased tensile strength and the property of true elasticity.

The stretched yarn is then stabilized to control subsequent shrinkage thereof at elevated temperatures; to increase the elongation and flexibility of the yarn; and to improve the resistance of the yarn to stresses normally encountered during subsequent processing operations, such as knitting and weaving, and during normal service.

The filaments, and the finished threads or yarns made therefrom, possess high wet- and dry-tensile strengths, together with true elasticity, resiliency and flexibility well adapting them for use in the production of knitted, woven, braided and otherwise fabricated textile articles. The filaments and yarns have exceptionally high softening temperatures; are resistant to chemical, bacterial and fungal attack; have good heat stability, and extremely low water absorbency; and do not support combustion. They may be dyed at the boil with acetate type dyestuffs, and with certain acid-type dyestuffs. The yarns are thermoplastic; but the novel resins from which they are made are not readily plasticized by some plasticizers suitable for the usual thermoplastic resins. The resins possess an entirely different range and shape plasticity curve, as evidenced by shrinkage or strain release over a range of temperatures, than other vinyl resins heretofore commonly used in the commercial production of textile filaments, such as those described in U. S. Patent No. 2,161,766 of E. W. Rugeley, T. A. Feild, Jr., and J. F. Conlon.

The vinyl resins from which the new filaments and yarns are made possess certain characteristics not possessed by resins formed by conjointly polymerizing a batch mixture containing a vinyl halide and acrylonitrile in the presence of a solvent, due to the surprising fact that acrylonitrile, in the presence of a vinyl halide, polymerizes at a much faster rate than the latter. Thus, a charge of 50% vinyl chloride and 50% acrylonitrile is converted to a resin having about 35.7% vinyl chloride in the polymer if the polymerization is carried to about 75% conversion. If higher conversions are obtained, the average content of vinyl chloride in the polymer will be higher, but the resin will be even less uniform, and will have the same acetone-insoluble fraction, high in acrylonitrile, as it would have if the polymerization were interrupted at low conversion.

The prime requisite of a vinyl resin suitable for spinning is that it be soluble in a volatile or readily removable solvent. It has been found that vinyl halide-acrylonitrile copolymer resins which contain less than 45% of the vinyl halide in the polymer are not completely soluble in acetone or other common organic solvents. Those copolymers containing more than 80% of vinyl halide tend to become too insoluble for spinning purposes, and the final products are not of distinctive interest, due to lower softening points. Polyvinyl chlorides of approximately the same molecular weight are over 50% insoluble in acetone. Polyacrylonitrile is insoluble in acetone. Of the copolymers of vinyl chloride and acrylonitrile having vinyl chloride contents of between 45% and 80%, those having specific viscosities of around 0.35 generally have the most favorable spinning characteristics.

The vinyl halide-acrylonitrile copolymers of the type found to be suitable as spinning resins may be produced by conjointly polymerizing the vinyl halide and the acrylonitrile in the form of an emulsion with water.

In the preparation of these emulsions it is customary to use emulsifying agents, such as water-soluble soaps, and sulfonated castor oil; and/or wetting agents, such as the water-soluble salts of alkylated derivatives of naphthalene sulfonic acid; and the esters of sulfonated dicarboxylic acids. A constant ratio of the reactants preferably is maintained in the reaction mixture at all times during the polymerization by appropriate additions of acrylonitrile, during the operation. The polymerization may be conducted either at around room temperature or below. However, it preferably is effected at elevated temperatures below around 60° C.—e. g., around 35° to 55° C. The polymerization is accelerated by the use of polymerization catalysts—e. g., the alkali metal persulfates; hydrogen-peroxide; and the organic peroxides, such as benzoyl peroxide. Pressures of from 20 to 110 pounds per square inch (gauge) are conveniently used.

A novel process for producing the novel vinyl halide-acrylonitrile copolymer resins useful in making the spinning compositions and textiles of the invention, forms the subject matter of an application for United States patent, Serial No. 488,508, filed May 26, 1943, by Leland C. Shriver and George H. Fremon.

The novel vinyl resin is completely dispersible in warm acetone or other suitable liquid, from which the filaments may be spun by either the wet- or the dry-spinning process. In preparation for the wet-spinning process, the resin and acetone (which need not be exceptionally dry) may be mixed in a dough-type kneading mixer which may have means to reflux the solvent. The temperature of mixing and subsequent handling of the spinning dispersion conveniently may be maintained at about 45°–50° C. Generally about five hours are required for the production of a suitably homogeneous dispersion of the resin. The resultant "dope" is a clear, gelatinous, readily flowable mass at room temperature and higher. About 12 to 15% of the resin, within the desirable specific viscosity range, generally is the maximum used. There may be incorporated in the spinning "dope" a small amount—e. g., about 0.25% of the weight of the resin—of a compound for further stabilizing the resin against decomposition by heat. Suitable compounds are organo-metallic tin and lead salts of carboxylic acids, such as dibutyl tin dilaurate. Such stabilizers are disclosed in the United States Patents Nos. 2,267,778 and 2,307,092 of V. Yngve.

The heated spinning "dope" is then filtered in one or more stages, generally under pressures of around 50 to 250 pounds per square inch, and while maintained at about 45° C., through a filter medium of cheese cloth, cotton batting and finely-woven muslin.

The filtered "dope," after standing for a brief period at 45° C. to de-aërate it, is metered by a standard gear-type spinning pump, and is forced through a candle-filter, maintained at around 30° to 50° C., and thence through a spinnerette of well-known type into a spinning bath containing a precipitant for the resin. A suitable spinnerette is one having 30 orifices, each 0.006 inch in diameter.

The spinning bath used in the wet-spinning process usually consists of water, which may contain up to 25% of acetone. The filaments leaving the spinning bath have filament deniers that may range from 3 to 15, depending on the size of the spinnerette orifices and the denier desired in the finished yarn. Such filaments contain a small amount of acetone, and are somewhat rubbery. As the filaments leave the spinning bath, they preferably are subjected to a preliminary stretching operation in one or more stages, for instance between rolls rotating at peripheral speeds which increase from roll to roll, until the filaments are extended to a selected multiple of their original length as formed. In one such operation, the filaments leaving the bath are drawn over a driven rotating godet, thence over an idler roll and again over the godet and to a take-up bobbin driven at a higher speed than that of the godet. The filaments are stretched about 150% or more between the godet and take-up bobbin. This preliminary stretching, or stretch spinning, while highly desirable, is not an essential step of the process. Excellent results are securable without the preliminary stretching step, by giving the yarn, after its formation, a correspondingly greater amount of stretch.

When utilizing a dry-spinning procedure, the spinning "dope" commonly contains around 18 to 25% of the dry resin, and is non-flowable at room temperature, while at temperatures around 30°–50° C. It is very viscous but slowly flowable. The filtered "dope" leaving the candle-filter is forced through a spinnerette of well-known type, and the resultant spun filaments then pass through the usual type of drying cell, where they are dried in contact with a stream of hot air at a temperature within the range between 85° and 125° C. and thence move to a take-up bobbin. A suitable spinnerette for dry-spinning the resin is one having 20 orifices, each 0.0024 inch in diameter.

The filaments or threads on the take-up bobbins contain some residual acetone. This may be removed by suitable means, as by ageing the filaments on the bobbins at room temperature, or by soaking the bobbins and contents in circulating water maintained at temperatures as high as 85° C., and preferably around 65° C. The filaments may then be immersed in a dilute aqueous solution of a lubricating and softening material, such as 0.5% solution of sodium oleate or other water-soluble soap solution. The soap, when used, also reduces the marked tendency of the filaments to adhere together at the high temperature to which they are subjected during the subsequent stretching operation, which tendency may prevent the use for certain purposes of yarns made therefrom.

The filaments may be collected, twisted and plied in well-known manner, as by means of a standard ring-twisting machine, providing a yarn having 2 to 8 or more turns per inch, ready for the stretching operation. The twist prevents the yarn from acquiring during later processing steps a ribbon shape which, when present, is "set" by the stretching operation, and gives the yarn an unsatisfactory appearance, and imparts to fabrics made therefrom an uneven structure.

The thread or yarn formed by the twisting and plying of the filaments is then stretched in order to provide a yarn having the requisite tenacity. In this step, the yarn, preferably after ageing or other treatment for the removal of residual acetone or other solvent present in the original spinning "dope," may be stretched while heated with steam. This may be effected by passing the yarn through an elongated cylindrical steam cell wherein the steam enters at the bottom, passes upward through the cell and thence through holes in a baffle therein and downwardly through the cell to a bottom outlet. The yarn passes around driven feed rolls, thence through the cell in contact with the steam, and thence to and around a take-up bobbin driven at such speed as to stretch the yarn an amount within the range generally between 200% and 1100% of its unstretched length, while the yarn is exposed to a temperature over 110° C., and preferably between 120° and 140° C. The yarn of the invention, when stretched under these conditions and subsequently stabilized as hereinafter described, possesses the surprising property, not possessed by yarn made of vinyl resin spinning-grade resins in general, of being dimensionally stable at elevated temperatures around 100° C., and of being relatively stable dimensionally at temperatures even as high as 125° C. under dry conditions.

Other methods of stretching the yarn or thread may be employed, such as for example, passing the thread, while under the requisite tension, over a heated surface, or through oil or other non-aqueous liquid, or by exposure thereof to radiant heat. When using dry heat, stretching temperatures of 110° C. and higher, e. g., 250° C., may conveniently be used.

Following the stretching operation, the yarn preferably is stabilized by controlled shrinkage thereof at selected elevated temperatures. The stabilization step is one of the most important in the production of the new yarn. It increases the ultimate elongation of the yarn, and makes possible the production of a yarn which possesses industrially-valuable properties equal or superior to those of yarns made from vinyl resins heretofore available commercially, including those made from copolymers of vinyl chloride and vinyl acetate. The resultant yarn further has the unique and extremely important property of dimensional stability when exposed continuously or repeatedly to elevated temperatures around 100° C. and even somewhat above.

The stabilization of the yarn preferably is accomplished by exposing the stretched yarn to moist heat—e. g., steam or hot water—at temperatures within the range between about 100° C. and about 150° C., an optimum temperature being around 125° C.; or by exposing the yarn to dry heat, such as radiant heat, an oil bath, etc., at a temperature within the range between about 100° C. and about 160° C. Higher stabilization temperatures may be employed. The period of exposure of the yarn to such heat commonly is around 1 to 1.5 hours, during which time the yarn may shrink from about 10% to about 25%, depending on the degree of stretch, etc. To facilitate the free shrinkage, the yarn preferably is stabilized in the form of skeins. After such stabilization, the yarn exhibits negligible shrinkage on subsequent exposure to temperatures used in the stabilization step, and shrinkage at higher temperatures is not objectionably high. The stabilization also increases the elongation of the yarn, and improves its flexibility, so as to enable it to withstand the stresses of subsequent processing steps, such as those encountered in knitting. Stretched yarns which, before stabilization possess tenacities of around 4.7 grams/denier; elongations of around 10.0% and shrinkages at 100° C. of around 19%, possess—after stabilization for one hour in boiling water—tenacities of around 4.2 grams/denier; elongations of 28%; and shrinkages at 100° C. in water of around 0.5%.

If desired, the yarn may be stabilized by shrinking it in cake form on collapsible bobbins having overlapping ends to permit free shrinkage. The stabilization likewise may be effected by a continuous process wherein the yarn is passed from a supply bobbin through a steam cell maintained at about 120° C. to 160° C., and thence fed to a take-up bobbin driven at a slower peripheral speed than the supply bobbin, whereby the yarn is substantially untensioned during the stabilization step.

While the temperature at which the stabilization is conducted affects the degree of shrinkage of the yarn during such step, it has been determined that in any case the stabilized yarn is dimensionally stable to considerable degree at sustained temperatures well above the temperature of stabilization. This is clearly exemplified by the accompanying drawing wherein is graphically represented the comparative dimensional stabilities of a yarn made in accordance with this invention, and of another vinyl resin yarn now commercially available. The values used in plotting the curves in the drawing were obtained on yarns immersed in oil.

In the drawing, curve "A" represents shrinkage characteristics of a yarn made from a vinyl resin VA formed by the conjoint polymerization of vinyl chloride and vinyl acetate, and containing between 80% and 95% of the vinyl chloride in the polymer, said resin having a macromolecular weight of over 15,000. The yarn was stretched 463% at 125° C. Curve "B" represents shrinkage characteristics of the same yarn after being stabilized by heating untensioned skeins thereof at 73° C. for 1 hour. Curve "C" represents shrinkage characteristics of a yarn VN, made from a vinyl chloride-acrylonitrile copolymer resin of the invention, which yarn has been stretched 505% at 133° C. Curve "D" represents similar properties of the same yarn VN after its stabilization by heating untensioned skeins thereof in boiling water at 100° C. for 1 hour.

The following table, giving properties of these two types of resins, illustrates the outstanding and unobvious dimensional stability of yarns made in accordance with this invention, even at temperatures far above those used in the stabilization:

The vinyl resin filaments of the invention, either in stretched or unstretched form, may be converted into staple fibers in any conventional manner.

The following examples will illustrate the invention.

Example I

A vinyl resin was prepared by heating at 40° C. in an autoclave, with agitation, during a period of 50 hours, an aqueous liquid containing 75 parts of water, about 22.1 parts of vinyl chloride, about 2.45 parts of acrylonitrile, about 0.25 part of potassium persulphate, and about 0.25 part of sodium di (2-ethylhexyl) sulpho-succinate, all parts being by weight. After initiation of the polymerization, acrylonitrile was added to the mixture in the autoclave in successive amounts sufficient to maintain a monomeric vinyl chloride monomeric acrylonitrile ratio of approximately 90:10, by weight. The resultant vinyl resin had a

| | Before Stabilization | | | Shrinkage at Temperature selected for Stabilization | Shrinkage at Temperatures above the Stabilization Temperature |
|---|---|---|---|---|---|
| Yarn | Denier | Tenacity | Elongation | | |
| | | Gms./denier | Per cent | Per cent | |
| VA | 17.2 | 4.68 | 19.9 | Around 7.2 | 56% at 7° C. above Stabilization Temperature. |
| VN | 28.2 | 4.93 | 8.2 | 12.3 | 19.4% at 25° C. above Stabilization Temperature. |

| | After Stabilization | | | Shrinkage at Temperature selected for Stabilization | Shrinkage at Temperatures above the Stabilization Temperature |
|---|---|---|---|---|---|
| Yarn | Denier | Tenacity | Elongation | | |
| | | Gms./denier | Per cent | Per cent | |
| VA | 19.5 | 4.10 | 30.1 | Around 2.2 | 51.7% at 7° C. above Stabilization Temperature. |
| VN | 35.5 | 3.94 | 24.1 | 0.64 | 2.31% at 25° C. above Stabilization Temperature. |

The foregoing chart and table illustrate the surprising and unusual capacity of the yarns of this invention to be stabilized and thereby minimize or decrease their shrinkage upon subsequent exposure to elevated temperatures, to which the yarns, and fabrics made therefrom, are commonly exposed during processing and use.

The finished and stabilized yarn may be air dried or centrifuged to remove water. It is then packaged by any of the conventional means for packaging synthetic filaments. For example, spooling, capping, skeining and coning may be readily performed; and, where necessary, lubricants may be applied to the yarn by any of the conventional means provided for the purpose.

When employing a dry-spinning process for the filament production, standard dry-spinning equipment may be used; and spinning "dopes" containing an acetone solution of as much as 25% of the resin may be employed. The resins also are soluble in acetonyl acetone, in cyclohexanone and, in general, in nitroethane. In one example of a dry-spinning procedure, using acetone as solvent, a 19% solution of a resin made by the conjoint polymerization of vinyl chloride and acrylonitrile, having a vinyl chloride content of 57.1% and a specific viscosity at 20° C. of 0.309, was filtered and spun through a spinnerette having 20 orifices, each 0.07 millimeter in diameter. The filaments thus formed were passed through a spinning cell, maintained at a drying temperature of 85° C., in contact with a stream of hot air. The subsequent processing steps were the same as those used in connection with the wet-spinning procedure already described.

vinyl chloride content of 62.9%, and had a specific viscosity at 20° C. of 0.315. The resin was coagulated by the addition of acetone in an amount about equal, by volume, to that of the charge. It was washed with water, dried, and dispersed in acetone to form a spinning "dope" containing 20% of the resin. To this "dope" was added around 0.25% by weight, based on the resin, of dibutyl tin dilaurate as a heat stabilizer. The "dope" then was agitated for over 4 hours at a temperature of 50° C., and was filtered and spun by forcing the "dope" by a metering-pump through a candle-filter of well-known type, and thence through a spinnerette having 20 orifices each 0.07 millimeter in diameter, under a pressure of 650 pounds per square inch. The filaments thus formed were dried by air heated to 120° C., and were then collected and wound upon a driven take-up spool at a rate of 75 meters per minute.

The bobbin cakes of the spun yarn were then heated to a temperature of 60° C. for 10 hours to remove the last traces of the solvent. Two ends of the yarn were plied with a twist of 8 turns per inch. The resultant yarn was stretched 1104% while heated at 127° C., during passage through a stretching cell in contact with steam. The resultant stretched yarn had the following characteristics:

Denier—28.
Wet strength—5.37 grams per denier; 10.5% elongation.
Shrinkage—28% in water at 100° C.

The yarn was then skeined, and the untensioned skeins were thermally stabilized by immersion in boiling water for one hour. The final stabilized yarn had the following characteristics:

Wet strength—3.25 grams per denier; 33.8% elongation.
Shrinkage—0.35% in water at 100° C.
Shrinkage—3.02% in mineral oil at 125° C.

Example II

The vinyl chloride-acrylonitrile conjoint polymer resin described in Example I was dispersed in acetone to yield a spinning "dope" having a total solids contents of 15%. To this "dope" was added 0.25%, by weight, of dibutyl tin dilaurate, based on the resin, as a heat stabilizer. The dispersion was effected in a jacketed mixer during a period of over 4 hours, while at a temperature of 45° C. After filtering the dispersion under pressure, the latter was spun by forcing through a spinnerette having 30 orifices each 0.006 inch in diameter, and into a precipitating bath of water containing approximately 3% of acetone, and maintained at approximately 24° C. (The filaments travel through about 12 inches of the spinning bath at a rate of about 60 feet per minute.) The filaments leaving the bath were collected and drawn through a guide, over a driven rotating glass godet, then over an idler roller, and then over the godet again. The filaments were then wound on a take-up bobbin driven at a higher speed than the godet, whereby the filaments received a preliminary stretch between the godet and bobbin of about 150%. The prestretched filaments had an average denier of about 175.

The filaments on the take-up bobbin were aged in a water bath at 65° C. for 6 hours to eliminate the acetone. Two ends of the yarn were then plied with two turns twist, and then the yarn was stretched 800% in a steam cell system at a temperature of 128° C.

The resultant yarns were thermally stabilized by skeining the stretched yarns and shrinking the untensioned yarns by immersion in a boiling water bath for one hour.

The following table presents certain characteristics of the yarn, both before and after the thermal stabilization in water at 100° C.

|  | Before Stabilization | After Stabilization |
|---|---|---|
| Denier | 43 | 51 |
| Filaments, number of | 60 | 60 |
| Wet Tenacity, grams per denier | 5.10 | 4.42 |
| Wet Elongation per cent | 8.8 | 26.7 |
| Shrinkage, in water at 100° C do | 19 | 0.7 |
| Shrinkage, in oil at 125° C do |  | 5.0 |

Example III

A vinyl resin was made by heating in an autoclave, at a temperature of 40° C., with agitation, for a period of about 91 hours, an aqueous emulsion containing about 75 parts of water; about 22.5 parts of vinyl chloride, about 2.5 parts of acrylonitrile, about 0.25 part of potassium persulfate, and about 0.25 part of a wetting agent, sodium di (2-ethylhexyl) sulpho succinate, all parts being by weight, and adding monomeric acrylonitrile to maintain the ratio of monomeric vinyl chloride to monomeric vinyl chloride acrylonitrile at about 90:10. The resultant copolymer resin had a vinyl chloride content of 60.1%, and had a specific viscosity at 20° C. of 0.300. It was soluble in acetone.

The resin was readily dispersed in acetone to form a spinning "dope" containing about 12.0% of the resin. The "dope" was readily filtered and spun. The filament extrusion was effected by forcing the resin dispersion by metering-pump through a candle-filter of well-known type, and thence through a spinnerette having 30 orifices each 0.006 inch in diameter, and into a precipitating bath of water maintained at around 25°–30° C. The filaments travelled through about 12 inches of the spinning bath at a rate of about 80 feet per minute. The filaments leaving the bath were collected and drawn through a guide, over a driven rotating glass godet, then over an idler roller, and then over the godet again. The filaments then were wound on a take-up bobbin driven at a higher speed than the godet, whereby the filaments received a preliminary stretch of about 150% between the godet and bobbin. The preliminarily-stretched filaments had an average denier of about 170.

The take-up bobbin with the filaments thereon was then soaked in circulating water maintained at 60° C. for 8 hours, after which the yarn was given a twist of around 8 turns per inch by means of a standard duplex ring twister, and then was bound on yarn supply bobbins. The filaments were delivered to the twister from spinning bobbins immersed in the water.

The twisted yarn was then stretched while under uniform tension by being passed from a supply bobbin and wound several times around driven feed rolls rotating at a rate proportional to the amount of stetch desired in the yarn. Between the feed rolls and take-up bobbin the yarn passed through a steam cell where it was heated by direct contact with steam while under tension, and was stretched to 505% of its original length at a temperature of 130° C.

The stretched yarn was then stabilized by reeling and skeining the yarn, and placing the skeins in boiling water at 100° C. for one hour.

The stretched yarn had the following properties before and after the stabilization treatment:

|  | Denier | Tenacity, Grams per Denier | Elongation, Per cent | Shrinkage, Per cent | |
|---|---|---|---|---|---|
|  |  |  |  | in water at 100° C. | in oil at 125° C. |
| Before stabilization | 28.5 | 5.01 | 9.4 | 18.5 |  |
| After stabilization at 100° C. for 1 hour in water | 37 | 3.71 | 31.5 | 0.35 | 6.7 |

Example IV

A 19% spinning dispersion or "dope" in acetone of a vinyl resin made by the conjoint polymerization of vinyl chloride and acrylonitrile, and having a vinyl chloride content of 57.1% and a specific viscosity at 20° C. of 0.309, was filtered. The "dope" was then heated to 45° C. and was forced by a metering pump through a spinnerette having 20 orifices each 0.07 millimeter in diameter into a stream of warm air heated to about 85° C. and flowing downwardly concurrently with the filaments within a 16-foot spinning cell having a jacket maintained at 95° C. The spun yarn then was wound on take-up bobbins at a rate of 100 meters per minute. The subsequent ageing, collecting, twisting, and plying of the filaments, and the stretching and stabilizing of the threads or yarns, were substantially the same as described in connection with Example I.

The properties of the resultant stretched yarn are given in the following table:

| | Denier | Tenacity, Grams per Denier | Elongation, Per cent | Shrinkage at 100° C., Per cent |
|---|---|---|---|---|
| Unstabilized yarn stretched 505% at 136° C | 36 | 4.00 | 14.0 | 22.0 |
| Same yarn, stabilized 1 hr. at 100° C. in water | 39 | 3.45 | 24.7 | 0 |
| Unstabilized yarn stretched 1051% at 131° C | 14 | 4.40 | 11.4 | 20.0 |
| Same yarn, stabilized 1 hr. at 100° C. in water | 19 | 3.50 | 24.4 | 1.2 |

The thermoplastic yarn produced in these examples possessed the typical properties of the new textile filaments, including a high true elasticity, high wet and dry strengths, and excellent resistance to chemical attack by dilute acids and alkalies, and to the action of ultraviolet light. The yarn is water-resistant, but may be surface-wetted by the use of wetting agents. It will not support combustion. It is resilient, and exhibits marked crease resistance. It will not support bacterial or fungus growth. It is a non-conductor of electricity, and is in fact an excellent electric insulator.

The yarn may be dyed by incorporating suitable dyestuffs in the resin dispersion prior to extrusion of the filaments; or the yarn may be dyed after its formation, in dyebaths employing acetate-type, basic-type, or acid-type dyestuffs, preferably at the boil.

The textile fibers and yarns may be delustered or dulled, when desired, by incorporating in the resin dispersion finely-divided pigments such as titanium dioxide. The extent of delusterization may be regulated by the amount and kind of the pigment and/or by the particle size of the pigment.

The filaments of this invention may be used, in either the stretched or unstretched condition, for the production of staple fibers or artificial wool-like masses. The filaments, or staple fibers made therefrom, can be used in the production of felted articles, threads, yarns, etc., either alone, or in conjunction with other types of natural fibers, such as cotton, wool and silk; and with artificial textile fibers, such as those made from cellulose acetate, regenerated nitrocellulose, regenerated cellulose, the various polyamides, and vinyl resins such as polyvinyl chloride resins, polyvinyl acetal resins, and resins made by the conjoint polymerization of vinyl chloride and vinyl acetate.

The new yarn can readily be knitted, woven, braided and plaited. It is especially adapted to knitting operations, and permits a tighter stitch without thread breakage than is possible with many known synthetic yarns. In weaving, the yarn may be used either as warp, filling or pile.

The unusual properties of the novel filaments and yarns of the invention make possible a wide variety of applications, wherein advantage may be taken of the yarn's properties of true elasticity; its high resilience, strength, and water-resistance; its resistance to attack by chemical influences and microorganisms; its inability to support combustion; and its capacity for being stabilized against undue shrinkage upon repeated exposure to temperatures of 100° C. and thereabove.

Thus, the new filaments, staple fibers, and yarns made therefrom, are useful in the manufacture of industrial filter fabrics, fishing lines and nets, sutures, bolting cloth, protective pipe coverings, electrical insulation, protective clothing, special woven fabrics such as glider fabrics and screen print fabrics; glider tow lines; parachute shrouds and cords and light weight tents; and in knitted fabrics such as bathing suits, and both full-fashioned and seamless hosiery. The new yarn is useful in pile fabrics such as velvet, and can be used therein as either the backing or the pile or both.

The yarn tenacities mentioned herein are those of the wet yarn, excepting where otherwise indicated. "Wet" tenacities of this yarn generally average about 5% lower than "dry" tenacities thereof.

We claim:

1. A stretched textile fiber composed of a vinyl resin resulting from the conjoint polymerization of vinyl chloride with acrylonitrile, substantially all portions of which resin are free from acetone-insoluble portions, contain between about 45% and about 80% of the chloride in the polymer, and which have a specific viscosity of between about 0.2 and about 0.6 at 20° C., the resin from which the fiber was formed being completely dispersible in acetone at about 50° C., and said fiber being dimensionally stable at elevated temperatures around 100° C.

2. A stretched synthetic textile yarn comprising filaments formed from a vinyl resin resulting from the conjoint polymerization of a vinyl halide with acrylonitrile, substantially all portions of which resin are free from acetone-insoluble portions, contain between about 45% and about 80% of the halide in the polymer and which have a specific viscosity of at least 0.2 at 20° C., said resin being completely dispersible in acetone at about 50° C., and said yarn having a high elasticity and a tenacity of at least 1.5 grams per denier, and being dimensionally stable at elevated temperatures around 100° C.

3. A stretched synthetic textile yarn formed of filaments of a vinyl resin resulting from the conjoint polymerization of a vinyl halide with acrylonitrile, substantially all portions of which resin are free from acetone-insoluble portions, contain between about 45% and about 80% of the halide in the polymer and which have a specific viscosity of between about 0.2 and about 0.6 at 20° C., said yarn having a high elasticity and a tenacity of at least 2 grams per denier, said yarn being dimensionally stable at elevated temperatures around 100° C., and the resin from which the yarn was formed being completely dispersible in acetone at about 50° C.

4. Knitted fabrics or articles comprising the stretched yarn defined in claim 2.

5. Woven fabrics or articles comprising the stretched yarn defined in claim 2.

6. Braided articles, lines, twines and cords comprising the stretched yarn defined in claim 2.

7. Synthetic textile fibers, fabrics and articles comprising stretched yarn composed of filaments formed of a vinyl resin resulting from the conjoint polymerization of a vinyl halide with acrylonitrile, substantially all portions of which resin are free from acetone-insoluble portions, are completely dispersible in acetone at 50° C., contain between about 45% and about 80% by weight of the vinyl halide in the polymer and have a specific viscosity at 20° C. of between about 0.2 and about 0.6, said yarn being dimensionally stable at elevated temperatures around 100° C., and being characterized by high tensile strength, high true elasticity and flexibility; crease resistance; electrical insulating properties; resistance to water, alkalies and dilute mineral acids; and resistance to attack by microörganisms.

EDWARD W. RUGELEY.
THEOPHILUS A. FEILD, Jr.
JOHN L. PETROKUBI.

REFERENCES CITED

The following references are of record in the file of this patent:

UNITED STATES PATENTS

| Number | Name | Date |
|---|---|---|
| 2,140,048 | Fikentscher et al. | Dec. 13, 1938 |
| 2,161,766 | Rugeley et al. | June 6, 1939 |
| 2,245,310 | Waterman et al. | June 10, 1941 |
| 2,277,782 | Rugeley | Mar. 31, 1942 |
| 2,287,099 | Hardy et al. | June 23, 1942 |
| 2,327,460 | Rugeley | Aug. 24, 1943 |
| 2,233,442 | Wiley | Mar. 4, 1941 |
| 2,100,900 | Fikentscher | Nov. 30, 1937 |
| 2,157,049 | Bartoe | May 2, 1939 |
| 2,176,153 | Semon | Oct. 17, 1939 |
| 2,239,780 | Fikentscher et al. | Apr. 29, 1941 |
| 2,404,781 | Arnold | July 30, 1946 |

Certificate of Correction

Patent No. 2,420,565. May 13, 1947.

EDWARD W. RUGELEY ET AL.

It is hereby certified that errors appear in the printed specification of the above numbered patent requiring correction as follows: Column 10, line 25, for "bound" read *wound*; column 14, after line 12, add the following references—

| 1,933,052 | Fikentscher et al. | Oct. 31, 1933 |
|---|---|---|
| 2,140,921 | Rein | Dec. 20, 1938 |
| 2,159,097 | Moncrieff et al. | May 23, 1939 |
| 2,199,411 | Lewis | May 7, 1940 |
| 2,317,409 | Seaton | Apr. 27, 1943 |
| 2,325,060 | Ingersoll | July 27, 1943 |
| 2,346,208 | Conaway | Apr. 11, 1944 | and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.* high true elasticity and flexibility; crease resistance; electrical insulating properties; resistance to water, alkalies and dilute mineral acids; and resistance to attack by microörganisms.

EDWARD W. RUGELEY.
THEOPHILUS A. FEILD, JR.
JOHN L. PETROKUBI.

REFERENCES CITED

The following references are of record in the file of this patent:

UNITED STATES PATENTS

| Number | Name | Date |
|---|---|---|
| 2,140,048 | Fikentscher et al. | Dec. 13, 1938 |
| 2,161,766 | Rugeley et al. | June 6, 1939 |
| 2,245,310 | Waterman et al. | June 10, 1941 |
| 2,277,782 | Rugeley | Mar. 31, 1942 |
| 2,287,099 | Hardy et al. | June 23, 1942 |
| 2,327,460 | Rugeley | Aug. 24, 1943 |
| 2,233,442 | Wiley | Mar. 4, 1941 |
| 2,100,900 | Fikentscher | Nov. 30, 1937 |
| 2,157,049 | Bartoe | May 2, 1939 |
| 2,176,153 | Semon | Oct. 17, 1939 |
| 2,239,780 | Fikentscher et al. | Apr. 29, 1941 |
| 2,404,781 | Arnold | July 30, 1946 |

Certificate of Correction

Patent No. 2,420,565.    May 13, 1947.

EDWARD W. RUGELEY ET AL.

It is hereby certified that errors appear in the printed specification of the above numbered patent requiring correction as follows: Column 10, line 25, for "bound" read *wound*; column 14, after line 12, add the following references—

| 1,933,052 | Fikentscher et al. | Oct. 31, 1933 |
|---|---|---|
| 2,140,921 | Rein | Dec. 20, 1938 |
| 2,159,097 | Moncrieff et al. | May 23, 1939 |
| 2,199,411 | Lewis | May 7, 1940 |
| 2,317,409 | Seaton | Apr. 27, 1943 |
| 2,325,060 | Ingersoll | July 27, 1943 |
| 2,346,208 | Conaway | Apr. 11, 1944 | and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.*